United States Patent [19]

Emrick et al.

[11] Patent Number: 5,394,545
[45] Date of Patent: Feb. 28, 1995

[54] SYSTEM FOR DETERMINATION AND DISPLAY OF MEMORY USED, DEDICATED, AND SHARED BY A PROCESS AT A PARTICULAR TIME

[75] Inventors: Samuel L. Emrick, Austin; Jimmie E. DeWitt, Georgetown; James H. Summers, Round Rock, all of Tex.

[73] Assignee: International Business Machines Corporation, Armonk, N.Y.

[21] Appl. No.: 927,083

[22] Filed: Aug. 7, 1992

[51] Int. Cl.⁶ ............................................. G06F 15/40
[52] U.S. Cl. ................................. 395/600; 395/575; 364/DIG. 1; 364/267; 364/264; 364/264.4
[58] Field of Search .............................. 395/600, 575

[56] References Cited

U.S. PATENT DOCUMENTS

| | | | |
|---|---|---|---|
| 5,103,394 | 4/1992 | Blasciak | 395/575 |
| 5,105,427 | 4/1992 | Ando | 371/40.1 |
| 5,138,713 | 8/1992 | Loten | 395/725 |
| 5,265,254 | 11/1993 | Blasciak et al. | 395/700 |
| 5,297,274 | 3/1994 | Jackson | 395/500 |
| 5,333,304 | 7/1994 | Christensen et al. | 395/575 |
| 5,347,649 | 9/1994 | Alderson | 395/600 |

OTHER PUBLICATIONS

The OSRM2 System, Version 1.1, 1989–1990, C.O.L. Consulting LTD, Purdys, New York.

Primary Examiner—Thomas G. Black
Assistant Examiner—Wayne Amsbury
Attorney, Agent, or Firm—Mark E. McBurney

[57] ABSTRACT

A system and apparatus is described to check pages in memory that are allocated to all processes and the operating system, and to check the pages in memory that are allocated to each individual process, in order to determine total RAM usage and RAM usage for a particular process, respectively. In order to determine total RAM usage for all processes and the operating system, a page frame table is used to count all memory pages being used. System memory pages, all process pages and unassigned pages are marked in a page frame table using a specific marking process. These marked pages are then summed and categorized for their particular usage, i.e. free memory, system memory or process memory. The RAM memory usage for a particular process can also be determined. First, RAM usage from operating system control blocks assigned to the specific process is computed. Next, the private memory area and shared memory area used by the process is determined by finding the pages associated with a memory object and counting the actual pages being used. The counted pages are then added to determine the total RAM in use for the particular process.

14 Claims, 7 Drawing Sheets

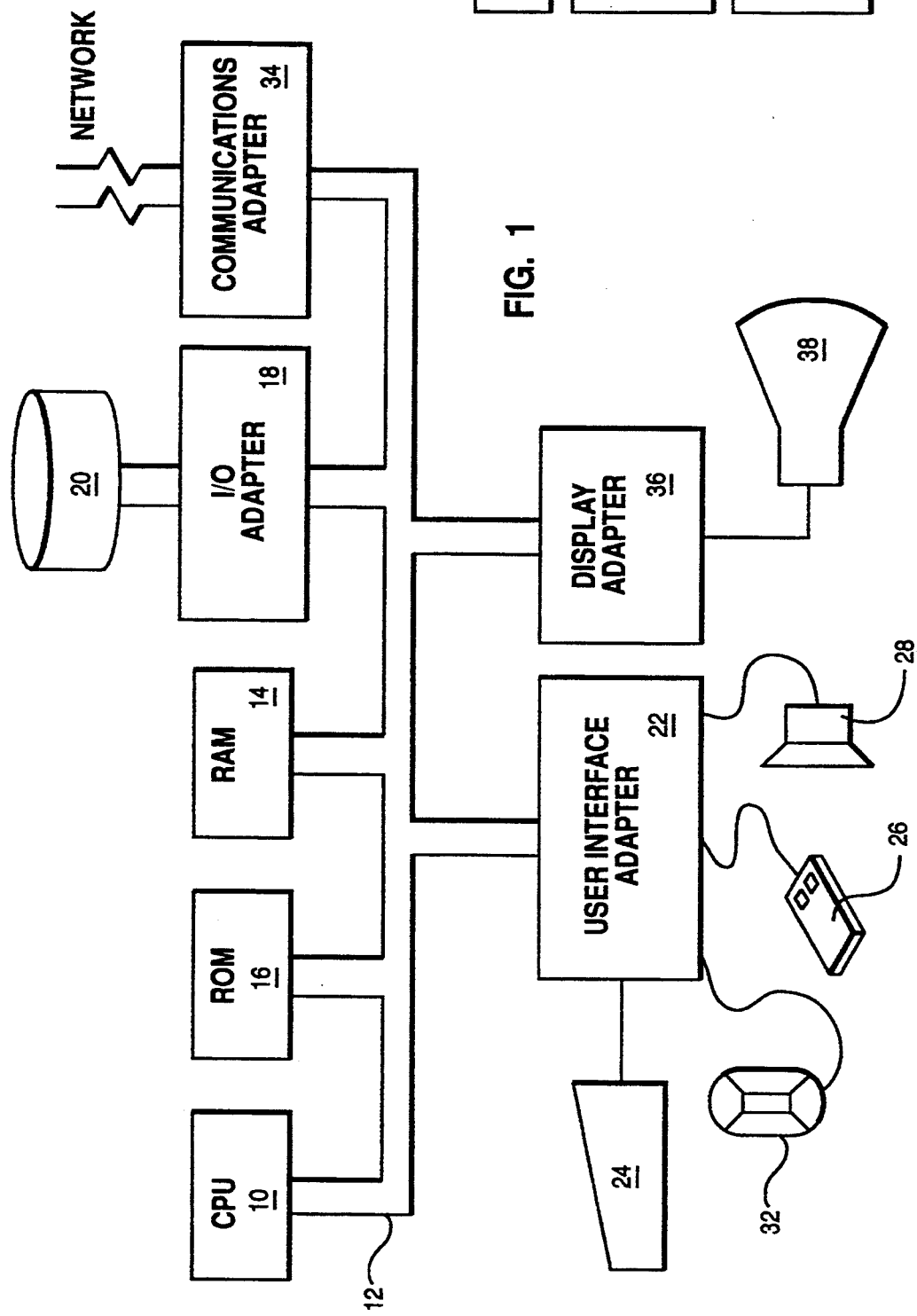

SYSTEM FOR DETERMINATION AND DISPLAY OF MEMORY USED, DEDICATED, AND SHARED BY A PROCESS AT A PARTICULAR TIME

CROSS REFERENCE TO RELATED APPLICATIONS

U.S. patent application, entitled "Real Time System Resource Monitor for Data Processing System with Support for Dynamic Variable Update and Automatic Bounding", Ser. No. 07/713,471, filed Jun. 10, 1991, now abandoned, assigned to the Assignee of the present invention and herein incorporated by reference.

U.S. patent application, entitled "Real Time System Resource Monitor for Data Processing System", Ser. No. 07/713,484, filed Jun. 10, 1991, now abandoned, assigned to the Assignee of the present invention and herein incorporated by reference.

BACKGROUND OF THE INVENTION

1. Field of the Invention

The present invention relates to interactive data processing systems and more particularly to a system for allowing users to determine the amount of Random Access Memory (RAM) being used by a single process or the amount of RAM being used by the operating system and all processes running in the system.

2. Description of Related Art

To improve the quality and efficiency of computer programs, several types of memory usage tools have been developed. For example the THESEUS program in the Operating System/2, version 1.2 (Operating System/2 and OS/2 are trademarks of the IBM Corporation) system computed the RAM used by all processes in the system. However, it did not allow the computation of the RAM used by only one process of interest. It computed the RAM used for all processes, displaying all of the usage information for the processes, leaving it up to the user to determine the process of interest and its related information. Further, because it was necessary to analyze all of the memory allocations of all the processes in the system, this analysis could take up to a full minute to complete. The previous memory usage programs used a scan of all physical memory in the system, determining the memory usage for all processes and the operating system.

When doing analysis of memory usage in an OS/2 system, it is often necessary to know the memory that one particular process in the system is using. Further it would be extremely valuable to be able to do the analysis of memory usage by a process quickly (in realtime). Additionally, it would be desirable, and may be necessary, to determine the exact purpose of several memory objects that make up the memory usage for that process. This information can then be used to determine if a process is efficiently using the system memory.

SUMMARY OF THE INVENTION

In contrast to the prior art, the present invention solves the aforementioned problems of interactive memory analysis of programs by providing functions that can quickly determine the amount of RAM in use by a single process. Further the amount of RAM used by the complete operating system and all processes can also be determined. The present invention is also capable of displaying the purpose of each memory object that is in use.

Broadly, the present invention achieves these functions by checking the pages in memory that are allocated to all processes and the operating system (to determine total RAM usage) and to check the pages in memory that are allocated to each individual process (to determine RAM usage for a particular process). In order to determine total RAM usage for all processes and the operating system, a page frame table is used to count all memory pages being used. More particularly, system pages, all process pages and unassigned pages are marked in the table using a specific marking process. These marked pages are then summed and categorized for their particular usage, i.e. free memory, system memory or process memory. This information is then displayed to assist the user in allocating system resources.

If it is desired to determine the RAM usage for a particular process, the present invention computes the RAM usage for operating system control blocks assigned to the specific process. Next, the private memory area used by the process is determined from the pages associated with each memory object owned by the process and summing the in-use pages of each object. The shared memory area is then determined from the pages in each memory object, that are shared by several processes that are associated with the specific process, and then summing the actual pages in use. The above subtotals for control blocks, private memory, and shared memory are then added to determine the total RAM in use for the particular process. This information is then displayed to the user.

Therefore in accordance with the previous summary, objects features and advantages of the present invention will become apparent to one skilled in the art from the subsequent description and the appended claims taken in conjunction with the accompanying drawings.

BRIEF DESCRIPTION OF THE DRAWINGS

The above and other features and advantages of the present invention will be described in greater detail having reference to the drawing wherein like reference numerals are used throughout to indicate the same elements and wherein:

FIG. 1 is a representative data processing system capable of implementing the present invention;

FIG. 2 is a block diagram showing the relationship of the present invention with respect to the processing system of FIG. 1 and the operating system software;

DETAILED DESCRIPTION OF THE PREFERRED EMBODIMENTS

Figure 3A:
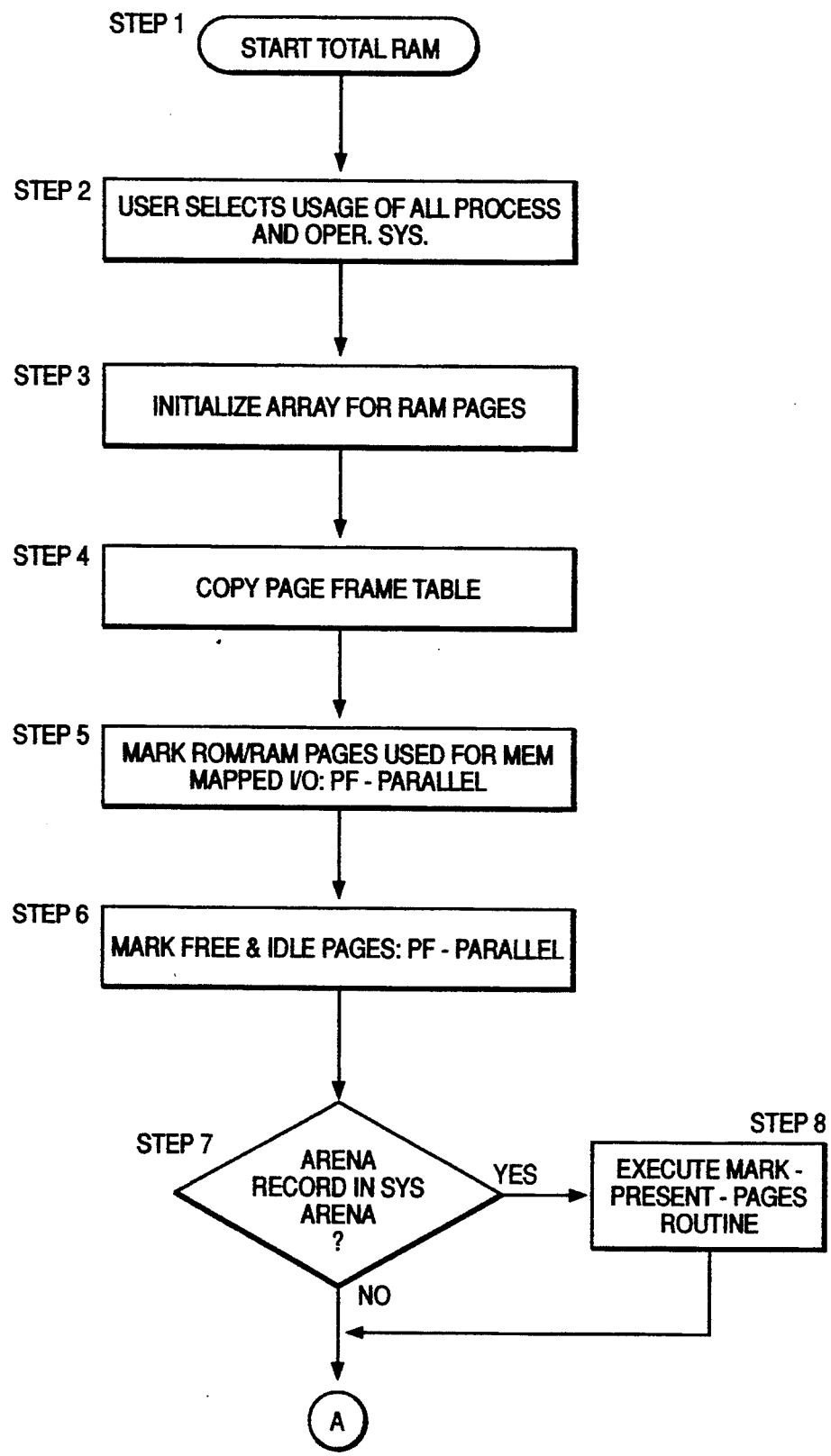
FIGS. 3A and 3B are a flow charts of the process for checking the amount of RAM used by all processes and the operating system that are running on the computer of FIG. 1.

Referring to FIG. 1, a typical data processing system is shown which may be used in conjunction with the present invention. A central processing unit (CPU), such as one of the Intel X86 processors is provided and interconnected to the various other components by system bus 12. Read only memory (ROM) 16 is connected to CPU 10 via bus 12 and includes the basic input/output system (BIOS) that controls the basic computer functions. Random access memory (RAM) 14, I/O adapter 18 and communications adapter 34 are also interconnected to system bus 12. I/O adapter 18 may be a small computer system interface (SCSI) adapter that communicates with a disk storage device 20. Communications adapter 34 interconnects bus 12 with an outside network enabling the data processing system to communicate with other such systems. Input/Output devices are also connected to system bus 12 via user interface adapter 22 and display adapter 36. Keyboard 24, track ball 32, mouse 26 and speaker 28 are all interconnected to bus 12 via user interface adapter 22. Display monitor 38 is connected to system bus 12 by display adapter 36. In this manner, a user is capable of inputting to the system through the keyboard 24, track ball 32 or mouse 26 and receiving output from the system via speaker 28 and display 38. Additionally, the operating system such as DOS or the OS/2 system (OS/2 is a trademark of IBM Corporation) is used to coordinate the functions of the various components shown in FIG. 1.

FIG. 2 is a block diagram of the components in a computing environment using the present invention. The data processing system illustrated in FIG. 1 is shown by reference numeral 100, and software operating system 102 runs in conjunction with the processing system 100 to control the basic functions thereof. In a preferred embodiment, the operating system is the OS/2 system which is commercially available by the IBM corporation. However, it should be noted that other operating systems, such as the Disk Operating System (DOS) and the like, are contemplated by the scope of the present invention. System performance monitor (SPM) 104 is a program application that runs on the operating system and uses its control functions to interact with the processing system hardware, in this case RAM 14, to monitor the system performance. The present invention is included within the SPM and is capable of controlling and interacting with various hardware components of data processing system 100, through calls, commands and the like interpreted and implemented by operating system 102.

Referring to FIG. 3A, the method utilized by the present invention to determine total RAM usage will now be described. At step 1, the method is started, and the user then selects from the display to check usage of the RAM by all processes and the operating system, at step 2. In the preferred embodiment, the present invention will be described in an OS/2 environment wherein processes are the owners of resources. Each application consists of one or more of these processes and each process has a name, which is the name of the .EXE (executable) program. Processes are uniquely identified within OS/2 by their process ID. An array, which includes an entry for each page of RAM in the machine is initialized at step 3. Those skilled in the art will understand that a page is defined as a 4 K-byte segment of memory. This array is referred to as PF-parallel (page frame) and is used to track the state of each page in memory, and which process (if any) is the owner of each page. In this manner the present invention ensures that each page of memory is counted at least once, and not counted more than once.

At step 4, a private of copy of the page frame table is made and labelled as private-PF. This table has an entry for each page, in the physical address page and includes all of the real RAM in the machine, as well as the input/output (I/O) address space and the ROM space located between 640 K-bytes and one megabyte. The page frame table is used to keep track of the contents of each physical page. A private copy of the table is made (private-PF) so that any changes in the state of the page table which may occur during the time when this process is being performed will not affect the results. At step 5, any pages that are ROM, and any RAM pages used exclusively for memory-mapped I/O are uniquely marked in the PF-parallel array. At step 6, any pages determined, from the private-PF table, to be free are uniquely marked as such in the table. Similarly, any pages determined from the private-PF to be idle (pages that have not been recently used and which have been marked by the operating system as eligible to be used) are also uniquely marked as such therein.

An arena is a doubly linked circular chain of arena records which maps a linear address space. There is a context record for each process that can access a memory object in the shared arena. An arena record is present for each memory object in the system which has linear address space allocated to it. Memory objects are the logical allocation units of memory. Applications allocate memory objects via DOSALLOCMEM or DOSALLOCSHAREDMEM functions.

Each process has a "private arena" which maps the linear address space that is unique to that process. The "shared arena" maps the space which holds memory objects which are shared among multiple processes. The "system arena" holds memory objects used by the operating system. At step 7 it is determined if the arena record is in the system arena and if so a MARKPRESENTPAGES (MPP) routine is called and executed (step 8) as shown is FIGS. 5A-5B. If the arena record is not in the system arena, the method of the present invention continues to step 9 which determines if memory pages are being checked for a process (program), other than the operating system, running on the computer system. If so, the MPP routine is executed at step 10 for arena records in the private arena, and the method of the present invention proceeds to step 11. If the memory for a program is not being checked, then the method directly proceeds to step 11, where it is determined if the arena record is in the shared arena. If so, at step 12, it is determined if a context record pointer is present. A context record pointer is used to identify context records which are present for each process which can access a memory object in the shared arena. If a context record pointer is present, step 13 then locates the program that is indicated as being the originator, i.e. the process that originally created the memory object. Subsequent to step 13, the MPP routine is executed for the memory pages associated with the originator process (step 15). If, at step 12, there is no context record pointer, then the MPP routine is executed for the dynamic linked library (DLL) of routines that are used by more than one process running on the computer system (step 14).

Next, step 16 determines if there are any entries in the PF-parallel array that have not been assigned or uniquely marked by the previous steps in the method of the present invention (steps 5 and 6). If so, the object record pointer is obtained from the private-PF table. An object record pointer indicates a record (object record)

of which memory objects are associated with particular pages in the private-PF table (step 17). The object record and linear address, from the arena record, are then used to determine which process should be charged with the page (step 18). If, at step 16, there were no unmarked or unassigned entries in the PF-parallel array, and subsequent to step 18, the method of the present invention proceeds to step 19 wherein, for each entry in the PF-parallel array, a page count is added to the appropriate category. That is, page counts are added to free memory, operating system memory, or memory used by a particular process. This information is then displayed showing the various categories including private and shared memory for the system and each currently active process (step 20). The method of the present invention then proceeds to step 21 and ends.

Figure 3B:
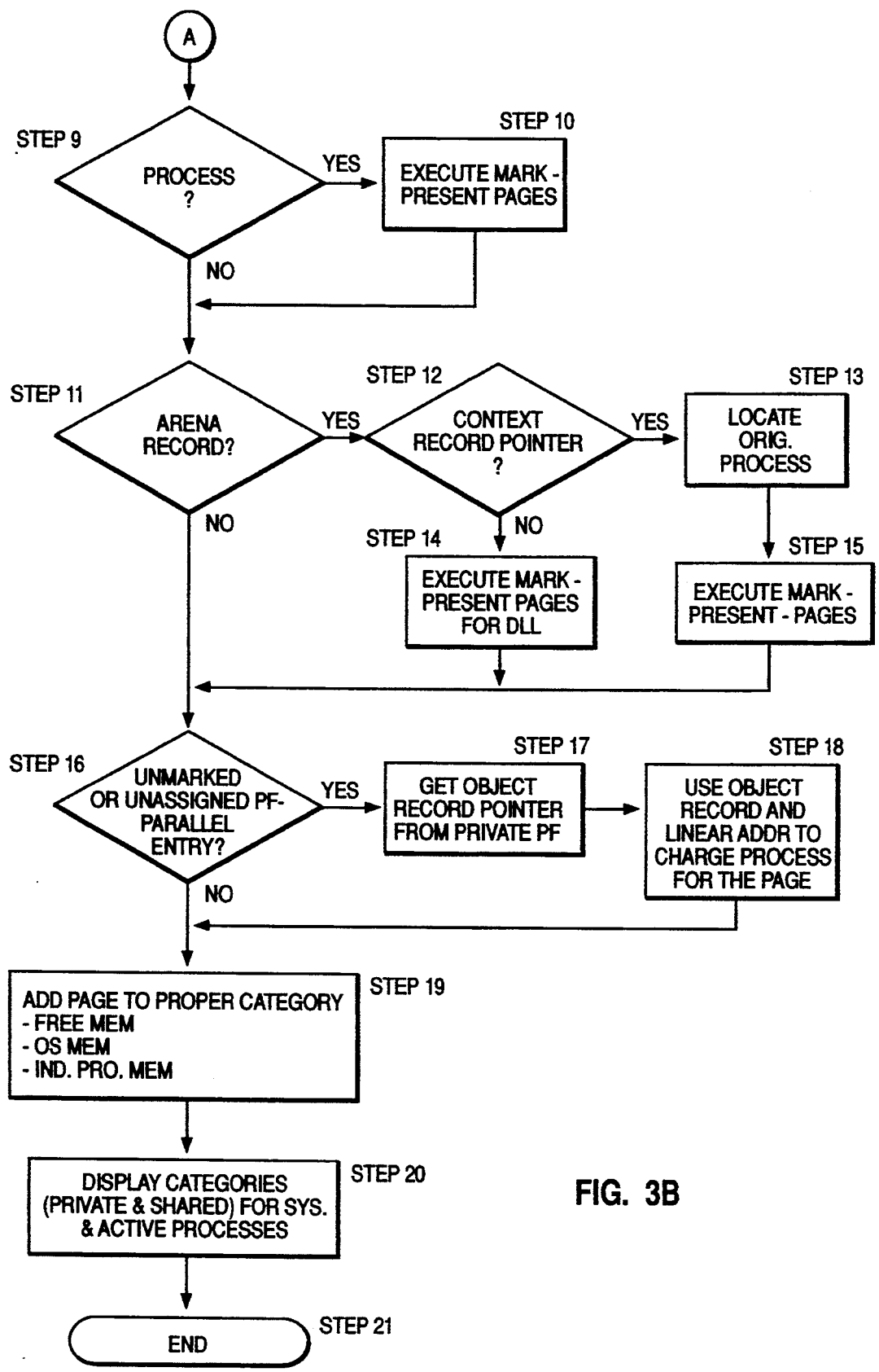
Figure 4A:
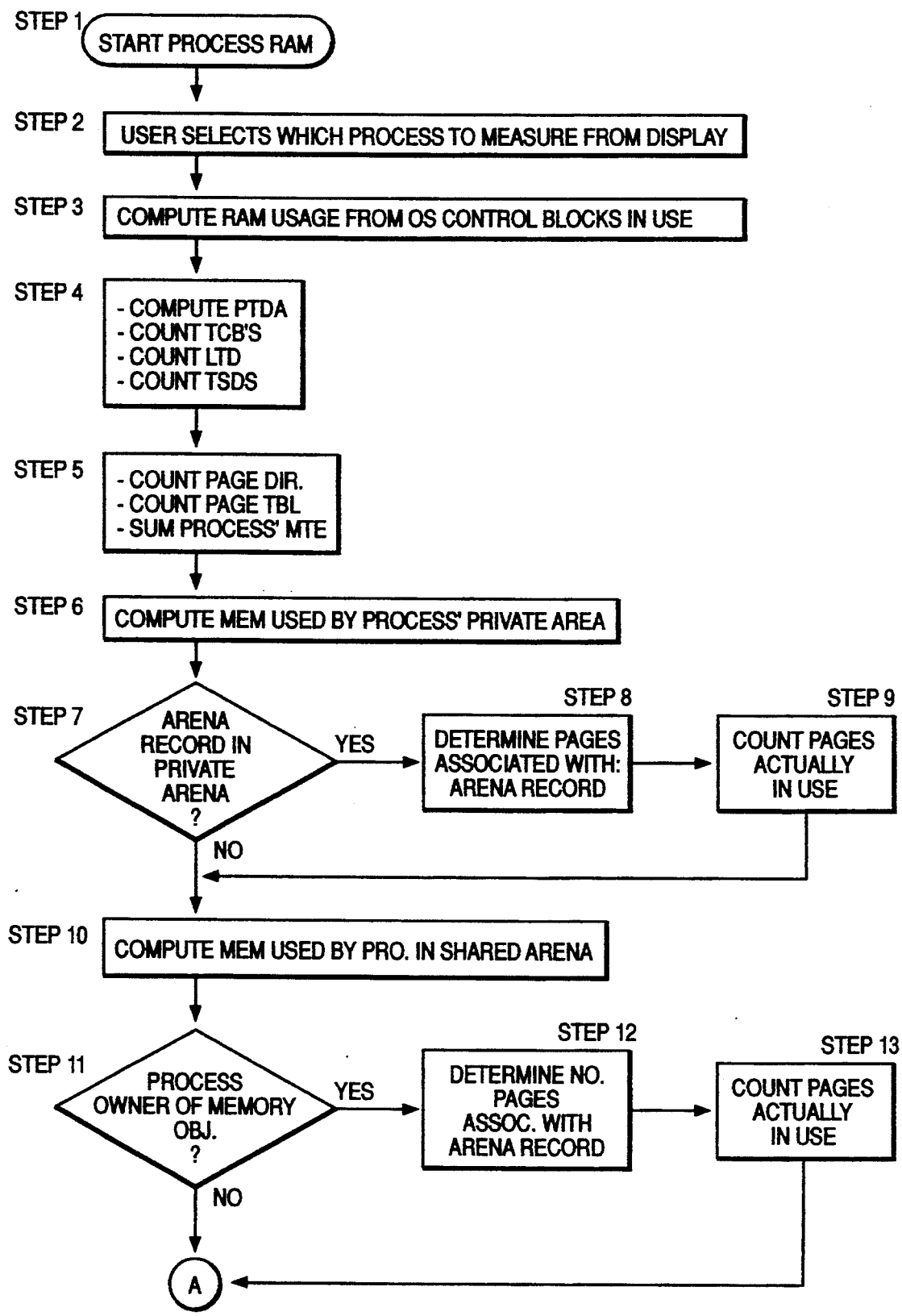
FIGS. 4A and 4B are flow charts of the process for checking the amount of RAM used by an individual process running on a computer system.
Figure 4B:
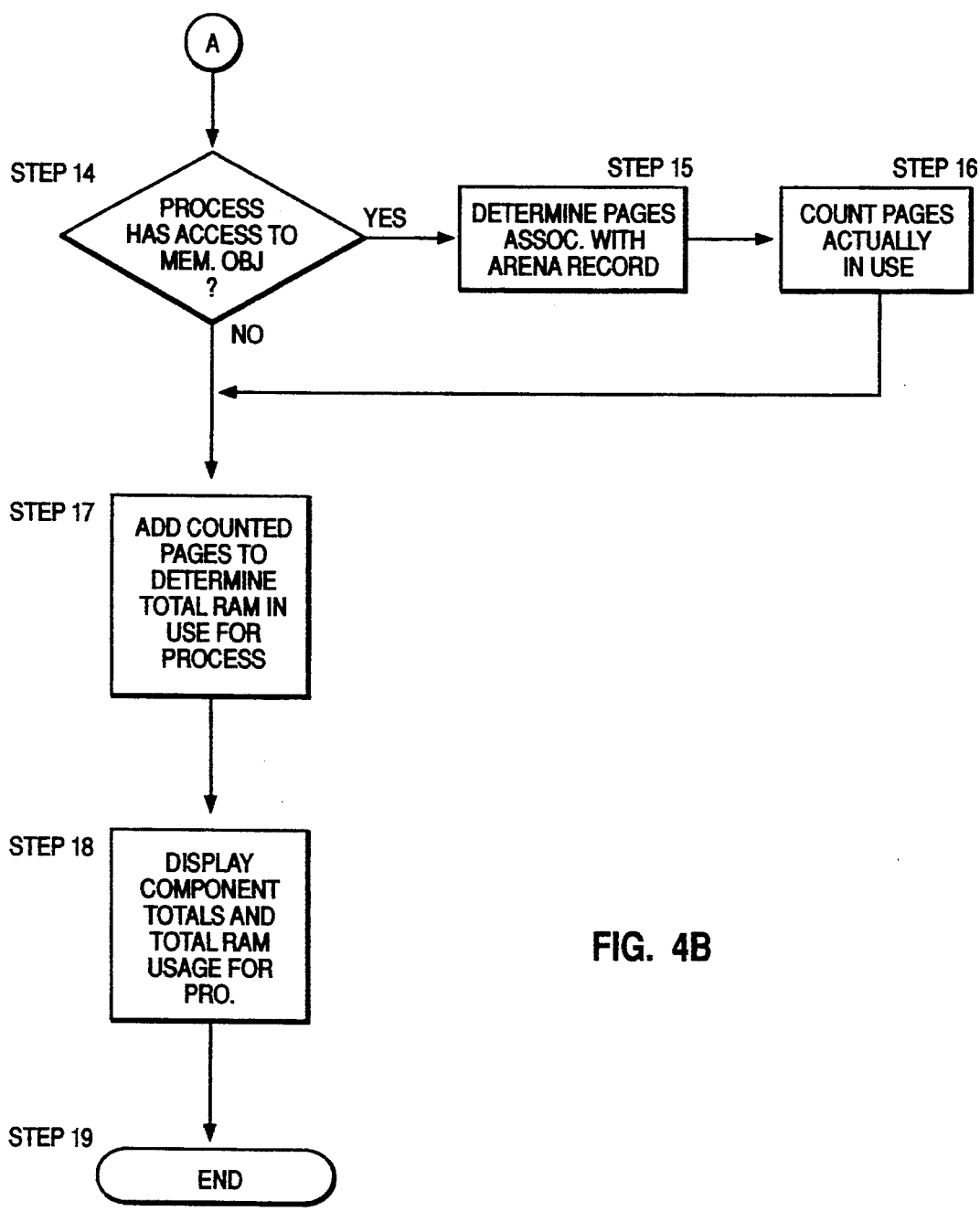
Figure 5A:
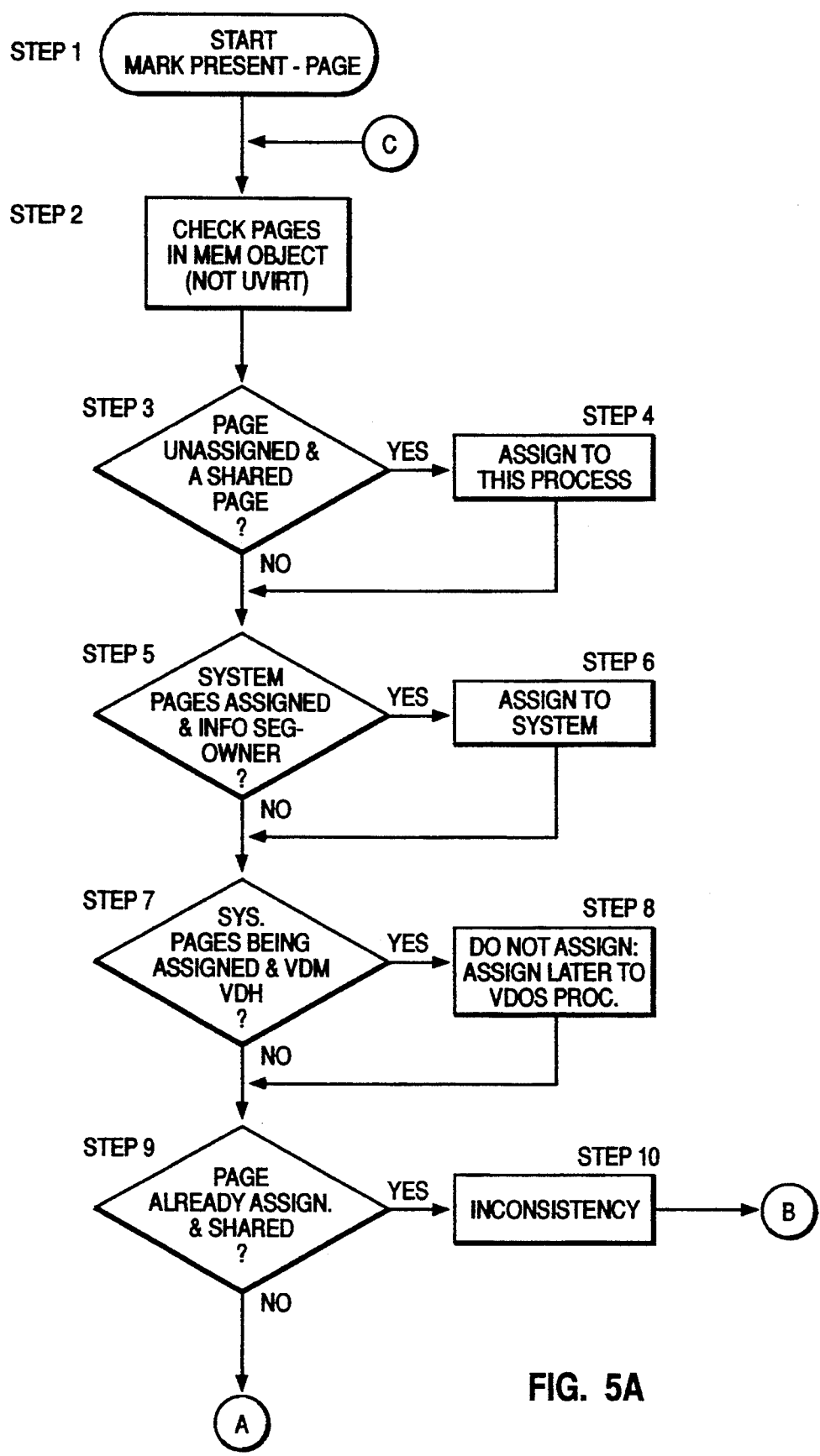
FIGS. 5A and 5B are flow charts of a process used to mark memory pages for use in determining the amount of RAM used by all of the processes and the operating system.
Figure 5B:
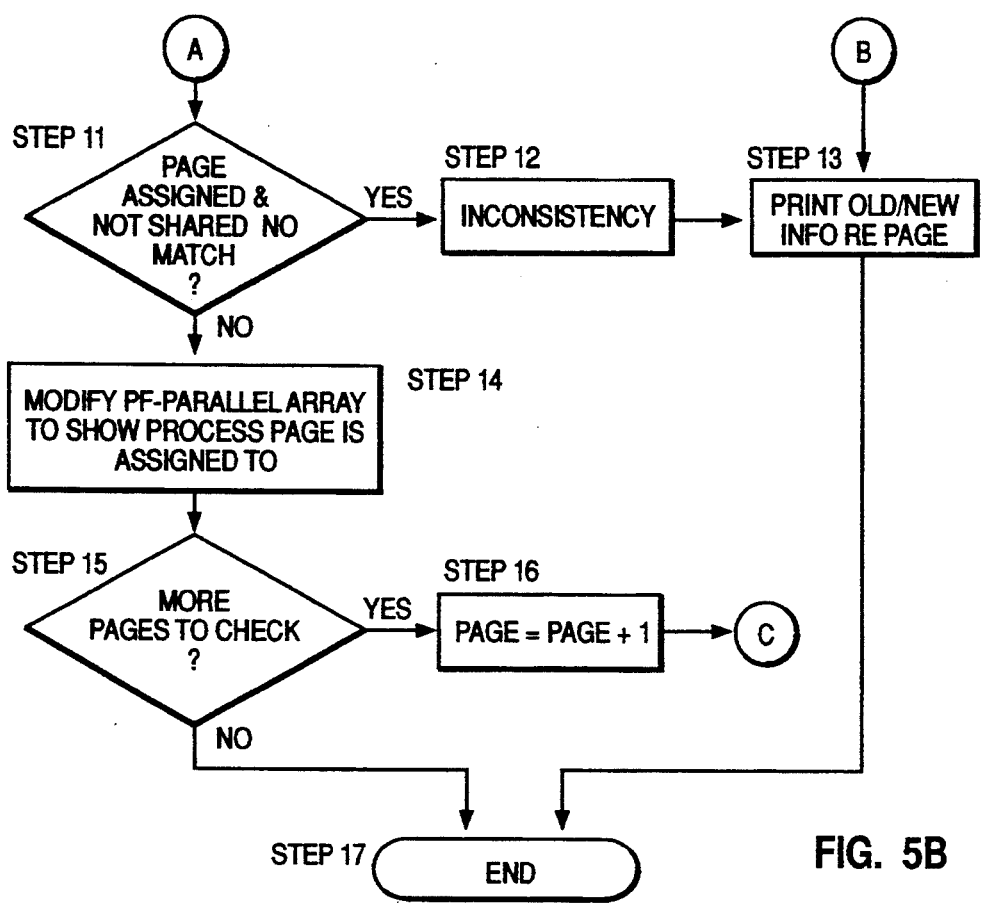

The MPP routine, that is executed in conjunction with the method which determines total RAM usage, as described above, will now be discussed with reference to the flowcharts of FIGS. 5A and 5B. At step 1, the MPP process is started (as a result of being executed by steps 8, 10, 14 and 15 of FIGS. 3A and 3B). Step 2 checks pages in the memory object that are present and not UVirt, which is being reviewed for memory usage. A UVirt page is a page table entry which does not point to an actual physical page of RAM. At step 3, it is determined if the page in memory is not yet assigned, and is a shared page. If true, the page is assigned to the process currently being considered (step 4). It is then determined, at step 5, if system pages (those associated with the operating system) are being assigned and if the owner code is shown as INFOSEGOWNER (code indicating the page is, in fact, associated with the system). If the operating system owner code is present, then the page is assigned to the system at step 6.

At step 7, it is determined if system pages are being assigned, and if the owner code shows VDMALIASOWNER or VDHOWNER, which indicates that a virtual DOS process owns this page in memory. If a virtual DOS process owns the page, then the page is not assigned at this time, but rather saved and later assigned to the virtual DOS process that owns the page.

If at step 9 it is determined that a page is already assigned and is a shared page, and the linear addresses do not match, then an inconsistency exists (step 10). Further, if at step 11, the page is determined to be previously assigned and is not a shared page, or the linear addresses do not match, then there is an inconsistency (step 12). When an inconsistency exists, the method of the present invention will cause the old and new information regarding the pages with inconsistencies to be printed, or displayed (step 13). If inconsistencies do exist, the method of the present invention then proceeds to step 17 and ends. However, if no inconsistencies exist, the method continues to step 14 which modifies the PF-parallel array to show the particular process that the page was assigned and the type of memory that is being used, i.e. shared memory, private memory or system memory. Step 15 then determines if there are more pages of memory to check, and if so, the page number is incremented, at step 16, and the method returns to step 2. If there are no remaining pages to check, the MPP routine proceeds to step 17 and ends.

The method of the present invention wherein RAM usage for individual processes, running on the system, will now be described with reference to Flowcharts 4A and 4B. At step 1, the method is initiated and the user selects which process will be measured for RAM usage from a display of currently active system and user processes (step 2). The method of the present invention then computes RAM usage by examining operating system control blocks which are being used by the process of interest (step 3). These control blocks include entries for each memory page and associate each process, and the operating system, to each entry. At step 4, the method of the present invention computes the size of the per task data area (PTDA) which describes the resources owned by the process, counts the size of all of the processes' thread control blocks (TCB) which is information unique to each execution thread (a dispatchable unit used within the OS/2 system, each process has one or more threads), counts the pages being used by the processes' changeable (swappable) portion (thread swappable data (TSD): a TSD is that portion of a TCB that is capable of being paged-out to a disk) and counts the number of memory pages being used by the processes' corresponding local descriptor table (LDT) which is used to provide compatibility with previous operating systems using 16-bit program compatibility, e.g. compatibility is provided between OS/2 version 1.2 (16-bit) and OS/2 version 2.0 (32-bit). Computing RAM usage of operating system control blocks being used by the process of interest is continued at step 5 wherein the size of the page directory (which is the first-level address translation table used by the computer system hardware to map a linear address to a physical address) is counted, the number of memory pages used to hold the page table for the process are counted (a page table is the second-level address translation table used by the computer system hardware to map a linear address to a physical address) and the size of the process components in the processes' module table entry (MTE) are summed (the MTE is an in-memory description of a module associated with the process of interest). Subsequent to determining RAM usage of operating system control blocks being used by the process of interest, the method of the present invention proceeds to step 6 which computes the memory used by the private memory area (private arena) associated with the process of interest.

Step 7 determines, from the operating system control blocks, if the arena record for the process is in the private arena, and if so, step 8 determines the number of pages associated with the arena record. For the pages determined to be in the processes' private arena, step 9 counts the actual pages being used. Subsequent to step 9 (or if no pages of the arena record are private) the method continues to step 10 wherein memory used by the process of interest in the shared arena is computed.

At step 11 it is determined, for each arena record in the shared arena, if the context records show the process as owner of the memory object. If so, the number of pages associated with the arena record is determined (step 12) and the pages actually in use are then counted at step 13. It is then determined if, for each arena record in the shared arena, the context records show that the process of interest has access to the memory object. It can be seen that the process must either own the memory object, or have access to it, in order to have any corresponding pages of memory. If so, the number of memory pages associated with the memory object is determined (step 15) and the pages actually being used are counted at step 16. It can be seen that the process must either own the memory object, or have access to it, in order to have any corresponding pages of memory. Further, it should be noted that the context records are bytes of information provided by the operating system, and included in the entries contained in the control blocks. The context record includes a flag (a bit contained in the context record byte) that is turned on to indicate the selected process is the originator of the memory object of the shared memory area. If the flag is turned off, the process is then known to have access to the shared memory area. In this manner, memory within a shared area currently being used and attributable to the process of interest is determined.

Next, at step 17, all of the pages previously counted in steps 3-16 are summed to determine the total RAM in use for the process of interest. The component totals (pages counted for OS control blocks, private area, shared area, and the like) and the total amount of RAM currently being used by the process is displayed at step 18. Subsequent to displaying the information, the method of the present invention proceeds to step 19 and ends.

Figure 6:
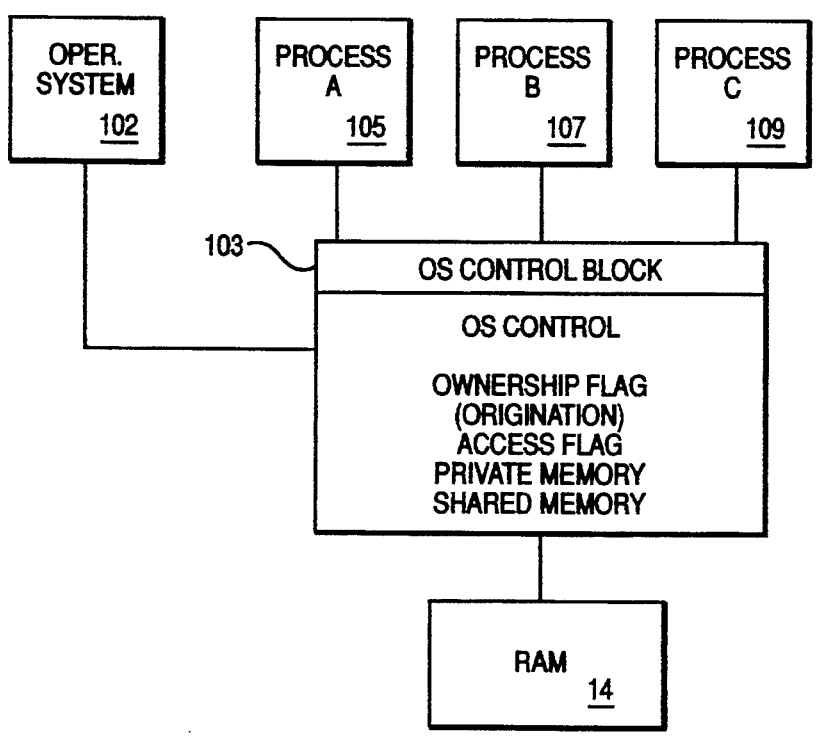
FIG. 6 is a block diagram showing the structure of various components which are used by the present invention to check for memory usage.

FIG. 6, illustrates the manner in which memory is allocated to the process of interest when a plurality of processes share the memory area. Ram 14 is shown as the memory device, but could be a plurality of memory chips located on a system board, adapter cards, or the like, as previously shown in FIG. 1. Control blocks 103 are controlled by the computer operating system 102 and associate each individual page in memory 14 with a process running on the computer system. Thus, as previously described, in order to check the memory usage for a selected process, control blocks 103 are checked to determined what types of control functions are chargeable to the process of interest. More particularly, the control block 103 includes an entry for each page in memory 14. The present invention is capable of determining which of these entries are attributable to the selected process, even though the memory is actually owned by the operating system. Although, the memory is actually owned by the operating system it is charged to the selected process since it would not be in used, but for the requirements of the process of interest. Next, the private memory utilized by the selected process is determined by reading the entries in the operating system control blocks and counting the pages that are solely attributable to the selected process. Additionally, the portion of shared memory that can be associated, or attributed, to the process of interest will be next be determined. Operating system 102 provides a context record for each entry in the control block 103. As previously noted the context record will include a flag, or other type of indicator, that will identify the selected process as the process that originated the shared memory area or a process that has access to the shared memory. With this information, the present invention can then check the operating system control blocks for the actual memory pages in use by the selected process when it either is the originator, or has access to the shared memory. For example, assume that process 105 is the selected process. First, the memory owned by the operating system, but chargeable to process 105 is determined from control blocks 103. Next, the private memory area that is dedicated only to process 105 is also determined from control blocks 103. Finally, the amount of any shared memory, that is associated with process 105 must be determined. In this case, assume that process 105 shares memory with processes 107 and 109. The total amount of shared memory that was either originated by process 105, or which process 105 has access to is determined from control blocks 103 using the flags set in the context records corresponding to process 105. The memory pages currently being used in the determined shared memory areas for which process 105 is the originator are then counted. Similarly, the memory pages currently being used in these shared memory areas that process 105 has access to are also counted.

All of the counted pages of memory that can be charged to process 105 are then added to find the total amount of RAM usage that is attributable to the selected process.

Although certain preferred embodiments have been shown and described, it will be understood that many changes and modifications can be made therein without departing from the scope of the appended claims.

What is claimed is:

1. A computer implemented method for determining usage, at a particular time period, of a memory device included within a data processing system by a selected one of a plurality of processes running on said data processing system, said computer implemented method comprising the steps of:

checking said memory device to determine a first number of memory locations used by said selected process during the particular time period that said selected process is interacting with an operating system running on said data processing system;

checking said memory device to determine a second number of memory locations dedicated solely to said selected process;

checking said memory device to determine a third number of memory locations shared by said selected process with at least one other of said plurality of processes and allocated to said selected process;

wherein said memory device is checked independent of any particular address contained therein; and displaying said first, second and third numbers on a display device.

2. A method according to claim 1 further comprising the steps of:

summing the totals said first, second and third numbers; and displaying said total.

3. A method according to claim 1 wherein said step of checking said memory device to determine said third number comprises the steps of:

determining whether said memory locations represented by said third number were originally allocated to said selected process; and counting memory pages in said memory locations represented by said third number which are currently being used by said selected process when said memory locations represented by said third number were originally allocated to said selected process.

4. A method according to claim 3 wherein said step of checking said memory device to determine a third number further comprises the steps of:

determining whether said selected process has access to said memory locations represented by said third number; and counting memory pages represented by said third number currently being used by said selected process when said memory locations represented by said third number are accessable by said selected process.

5. A method according to claim 4 wherein said step of checking said memory device to determine a first number comprises the step of counting pages in said memory device corresponding to said first number.

6. A method according to claim 5 wherein said step of checking said memory device to determine a second number comprises the step of counting pages in said memory device corresponding to said second number currently being used by said selected process.

7. A method according to claim 6 further comprising the steps of:
adding the counted memory pages in said third number currently being used by said selected process to determine the number to be associated with said selected process; and
summing said pages of memory corresponding to said first, second and third number and said portion of said pages corresponding to said third number allocated to said selected process.

8. A system that determines usage, at a particular time period, of a memory device included within a data processing system by a selected one of a plurality of processes running on said data processing system, comprising:
means, within a central processing unit, for checking said memory device to determine a first number of memory locations used by said selected process during the particular time period that said selected process is interacting with an operating system running on said data processing system;
means, within said central processing unit, for checking said memory device to determine a second number of memory locations dedicated solely to said selected process;
means, within said central processing unit, for checking said memory device to determine a third number of memory locations shared by said selected process with at least one other of said plurality of processes allocated to by said selected process;
wherein said memory device is checked independent of any particular address contained therein; and
means for displaying said first, second and third numbers on a display device.

9. A system according to claim 8 further comprising:
means for summing the totals said first, second and third numbers; and
means for displaying said total.

10. A system according to claim 9 wherein said means for checking said memory device to determine said third number comprises:
means for determining whether said memory locations represented by said third number were originally allocated to said selected process; and
means for counting memory pages in said memory locations represented by said third number which are currently being used by said selected process when said memory locations represented by said third number were originally allocated to said selected process.

11. A system according to claim 10 wherein said means for checking said memory device to determine a third number further comprises:
means for determining whether said selected process has access to said memory locations represented by said third number; and
means for counting memory pages represented by said third number currently being used by said selected process when said memory locations represented by said third number are accessable by said selected process.

12. A system according to claim 11 wherein said means for checking said memory device to determine a first number comprises counting pages of memory within said first number.

13. A system according to claim 12 wherein said means for checking said memory device to determine a second number comprises counting pages in said memory device corresponding to said second number currently being used by said selected process.

14. A system according to claim 13 further comprising:
means for adding the counted memory pages in said third number currently being used by said selected process to determine the number to be associated with said selected process; and
means for summing said pages of memory corresponding to said first, second and third number and said portion of said pages corresponding to said third number allocated to said selected process.

* * * * *